United States Patent [19]
Martone et al.

[11] Patent Number: 4,833,978
[45] Date of Patent: May 30, 1989

[54] INTELLIGENT COFFEE BREWING SYSTEM

[75] Inventors: Louis C. Martone, Shelton; Robert F. Burkholder, Huntington; Lars F. Asbjornsen, Southbury; Luis O. Cavada, Bridgeport, all of Conn.

[73] Assignee: Black & Decker, Inc., Towson, Md.

[21] Appl. No.: 216,409

[22] Filed: Jul. 6, 1988

[51] Int. Cl.$^4$ .............................................. A47J 31/00
[52] U.S. Cl. ......................................... 99/280; 99/283; 99/285; 99/295; 99/299
[58] Field of Search ................. 99/279, 280, 281, 282, 99/283, 295, 285, 288, 299, 300, 302 R, 304, 305, 306, 307; 426/433; 219/280, 281, 308, 309, 333, 297

[56] References Cited

U.S. PATENT DOCUMENTS

| | | | |
|---|---|---|---|
| 4,165,681 | 8/1979 | Belinkoff | 99/295 |
| 4,579,048 | 4/1986 | Stover | 99/280 |
| 4,667,587 | 5/1987 | Wunder | 99/295 |
| 4,767,632 | 8/1988 | Meier | 99/283 |
| 4,790,240 | 12/1988 | Henn | 99/283 |

Primary Examiner—Robert W. Jenkins
Attorney, Agent, or Firm—Perman & Green

[57] ABSTRACT

A coffee brewing unit is disclosed which enables a brew cycle to be initiated manually or automatically at a preset time, but which prevents a brew cycle from proceeding if a number of required operating conditions are not implemented. If all operating conditions again become implemented after a brew cycle, once underway, is interrupted, the brew cycle continues on to completion. Visual and audible signals indicate the current status of the brew cycle and/or of the brewing unit itself. An insulated carafe is used as the vessel to receive brewed coffee thereby eliminating the need for a warmer plate. The unit may be mounted under a cabinet to thereby maximize usable countertop space and the brew basket utilizes a dispensing valve which is opened by the carafe when inserted into position but which closes when the carafe is withdrawn. A thermostat which is used in association with the water generator for the unit has a manual reset switch which is actuated by a self contained water reservoir when moved into its operating position.

38 Claims, 9 Drawing Sheets

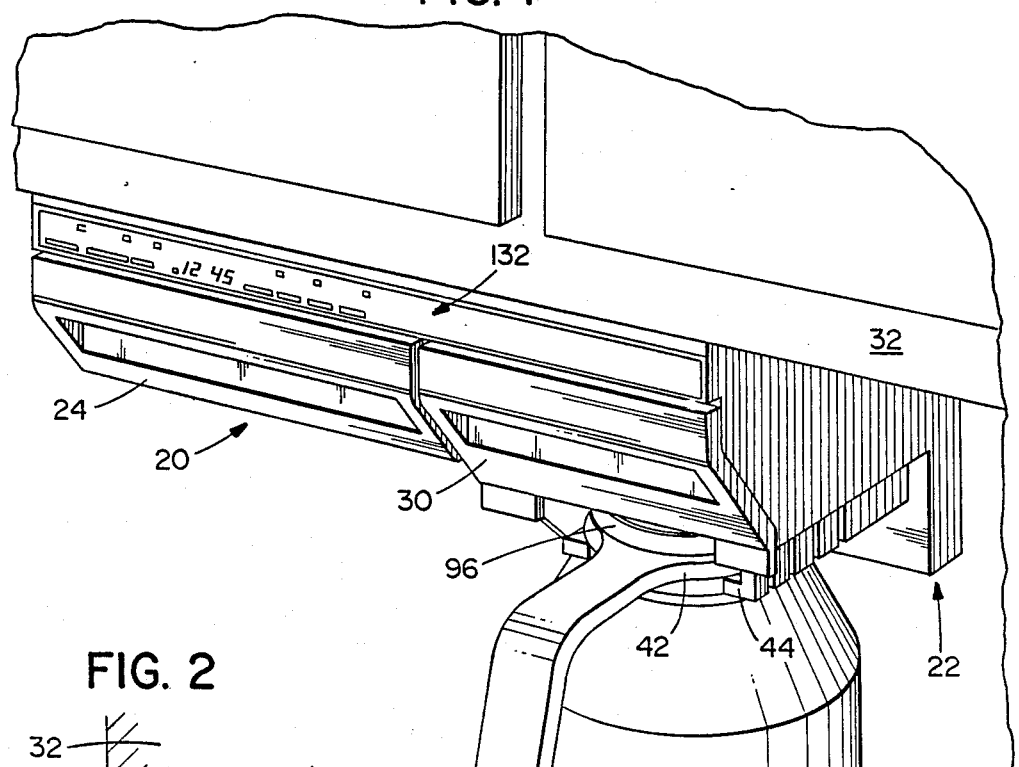
FIG. 1
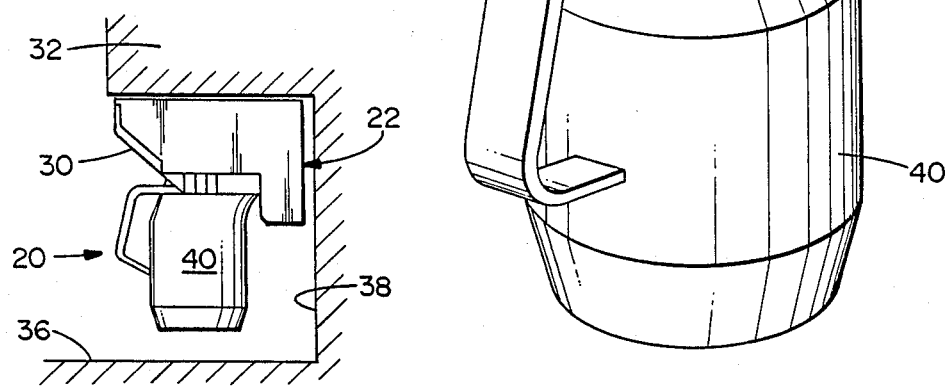
FIG. 2
FIG. 15
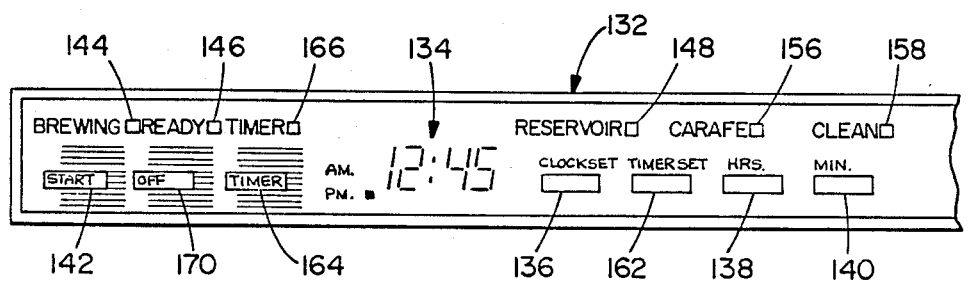

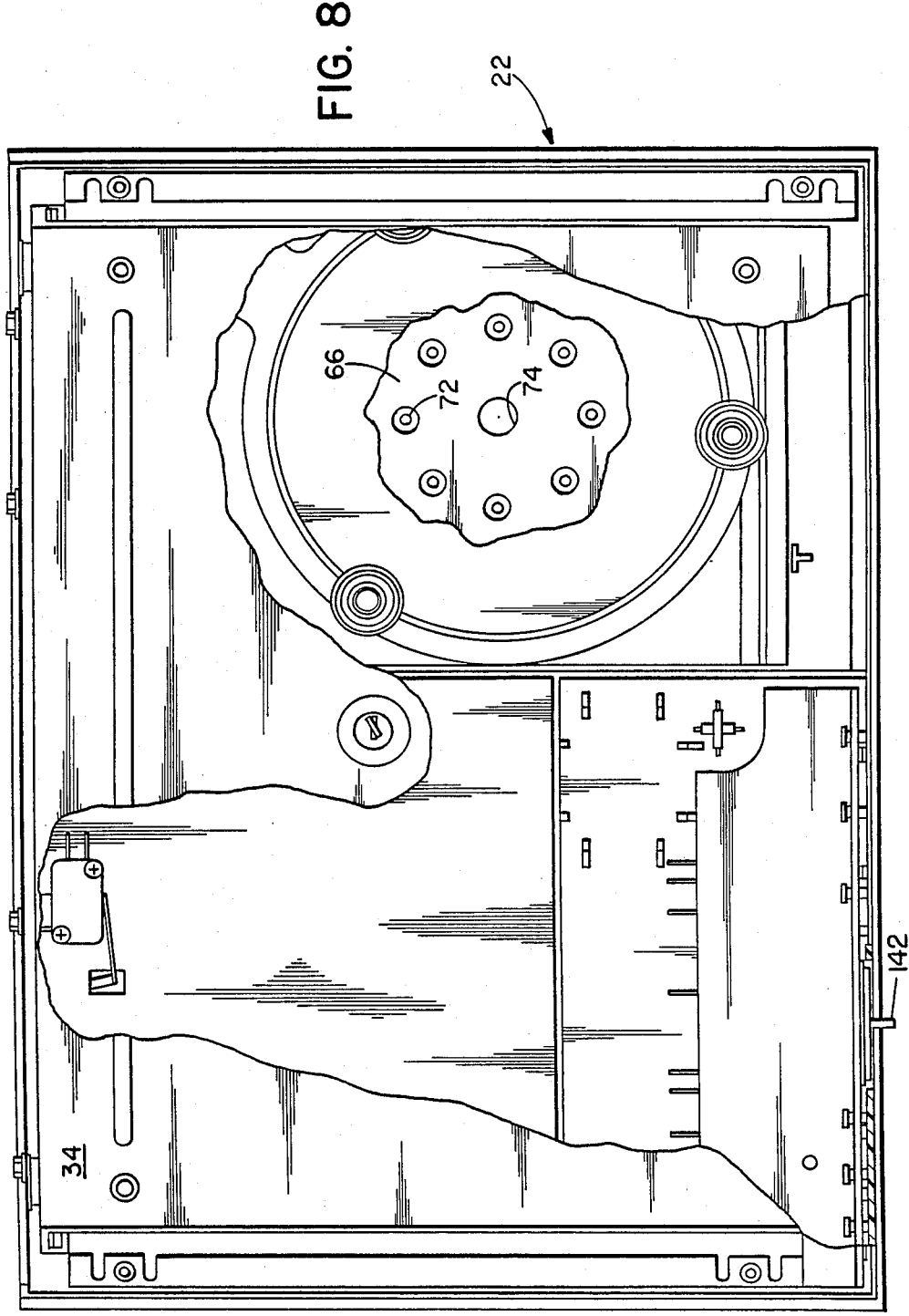

INTELLIGENT COFFEE BREWING SYSTEM

BACKGROUND OF THE INVENTION

1. Field of the Invention

This invention relates to coffee brewing apparatus which allows a brew cycle to be initiated either manually or automatically at a preset time but which prevents a brew cycle from proceeding if a plurality of required operating conditions are not implemented.

2. Description of the Prior Art

Numerous efforts have been made over the years to automate coffee brewing apparatus intended for household use. These have often been of complex design utilizing costly components, subject to frequent breakdowns, and requiring frequent and expensive maintenance in order to keep them in operating condition. In a recent instance, U.S. Pat. No. 4,682,537 discloses a commercial vending machine which provides probes arranged at different levels for sensing the amount of brewed coffee remaining. When a tank containing the brewed coffee is approximately one-third full, a "coffee low" light is displayed and a new coffee making cycle may be initiated either automatically of manually.

Another construction for commercial purposes is disclosed in U.S. Pat. No. 4,621,571 which provides a plurality of satellite receptacle units for the storage and dispensing of hot coffee which can be filled from a central brewing unit. A safety switch assembly assures that a brewing cycle cannot be initiated unless the brew chamber is properly aligned to discharge into a correspondingly aligned empty satellite unit.

An automatic household coffee brewing machine is disclosed in U.S. Pat. No. 4,566,802 which is programmable to begin a brewing cycle at a predetermined time, but which assures that an unattended coffee maker is not repeatedly activated thereafter. Thus, after filling the coffee maker with water and ground coffee, the user must manually supply a cycle enable signal, for example, by toggling a switch.

Automatic beverage brewing apparatus is disclosed in U.S. Pat. Nos. 4,608,916, 4,406,217, and 4,468,406, each of which allows a user to choose a desired number of cups of coffee as well as its strength. In U.S. Pat. No. 4,608,916, a plurality of indicator lights indicate no coffee, no water, and used filter, but there is no provision for rendering the apparatus inoperative in the event any of the indicator lights are lighted. In U.S. Pat. No. 4,468,406, there is mentioned, but no disclosure, of a low-water shut-off mechanism and associated alarm.

In U.S. Pat. No. 4,484,515, a sophisticated commercial expresso coffee machine is disclosed which brews coffee pods placed in one or more extraction heads. It includes an electronic control system which operates all functions of the machine including maintaining careful monitoring and control of the water temperature and the volume of hot water delivered to each extraction head. The machine diagnoses itself for possible failures and depleted supplies by showing on a display in code the kind of failure or of needed supply, for example, coffee, water. Each step of an operation is controlled until completion and the machine proceeds to the next only upon confirmation of proper execution of the earlier step. In the absence of confirmation, subsequent operations are not performed. Instead, a digital code signal is displayed in the machine panel corresponding to the failure or depletion in the machine.

Manually initiated coffee brewing apparatus is disclosed in U.S. Pat. No. 4,012,481 which includes a mill mechanism and utilizes a heater circuit containing a cover switch and a pair of other switches which control the heater mechanism. If all switches are closed, once initiated, a brew cycle proceeds to conclusion. Otherwise the apparatus remains inoperative except to digitally display a difficulty, such as "LID", to indicate that the cover is open.

It was the intent of the inventors to improve on known systems of the type just noted. Specifically, it was their intent to provide coffee brewing apparatus incorporating modern features while utilizing a system exhibiting a simplified construction and operation resulting in its being less expensive to manufacture and maintain. These goals have been achieved by reason of the present invention.

SUMMARY OF THE INVENTION

To this end, a coffee brewing system is disclosed which enables a brew cycle to be initiated manually or automatically at a preset time, but which prevents a brew cycle from proceeding if a number of required operating conditions are not implemented. If all operating conditions become implemented again after a brew cycle, once underway, is interrupted, the brew cycle continues on to completion. Visual and audible signals indicate the current status of the brew cycle and/or of the brewing unit. An insulated carafe is used as the vessel to receive brewed coffee thereby eliminating the need for a keep warm plate. The unit may be mounted under a cabinet to thereby maximize usable counter top space and the coffee basket utilizes a dispensing valve which is opened by the carafe when inserted into position but which closes when the carafe is withdrawn. A thermostat which is used in association with an electrically energizable hot water generator for the unit has a manual reset switch which is activated by a self contained water reservoir when moved from a withdrawn position into its operative position.

A water supply conduit is in communication with and extends between a brewing station and the water reservoir when the latter is in its operative position to enable the flow of water from the reservoir to the brewing station. The hot water generator heats the water in the supply conduit between the operative water reservoir and the brewing station to a sufficient extent as it flows to enable coffee to be brewed at the brewing station. An electronic control system is used for initiating a brewing cycle and, thereafter, for enabling the brewing cycle to proceed to its conclusion. It allows for a brewing cycle to be initiated either manually or automatically at a preset time. The electronic control system also provides for interrupting a brewing cycle in the event any one of a plurality of operating conditions are not implemented. Specifically, the brew cycle will not commence, or continue, in the event the water reservoir is not in its operating position, or if there is no water in the water reservoir, or if the carafe is not in its operating position. Also, the apparatus will not operate in the event of severe calcification of the system requiring cleaning in a known manner. This ability of the apparatus to interrupt a brew cycle unless all conditions are fulfilled eliminates possible damage to the apparatus, excessive waste of materials and energy, and avoids a soiled work area of the type which can occur in the event a carafe or other vessel for receiving the brewed coffee is not positioned to receive the coffee during the brew cycle.

Another benefit of the invention is a significant increase achieved of usable counter space by reason of the invention. Specifically, an insulated carafe is used which obviates the necessity for a warmer plate beneath the coffee receiving vessel. Accordingly, the countertop itself is completely free for use. In accordance with the present invention, the carafe, in its operative brewed coffee receiving position, is suspedded from an upper rim. When not in use, the carafe can be removed, thereby further increasing the space between the countertop and the underside of the coffee brewing available for use for other purposes.

Also, the brewing system of the invention provides a drip stop for a coffee basket positioned at the brewing station. Specifically, the brewing basket incorporates a cam operated valve mechanism which is biased to a closed position to prevent flow of coffee from the brew basket. However, when the carafe is moved to its coffee receiving position, its lid engages the cam operated valve mechanism which causes it to open and permits the flow of brewed coffee into the carafe.

Still another benefit of the invention resides in its construction according to which insertion of the self contained water reservoir to its operating position serves to manually reset the thermostat associated with the hot water generator and positioned at the rear of the apparatus. The resetting operation is achieved without the use of complex linkages or with the requirement of a manually operated mechanism representing still an additional operation to be performed by the user.

Other and further features, objects, advantages, and benefits of the invention will become apparent from the following description taken in conjunction with the following drawings. It is to be understood that both the foregoing general description and the following detailed description are intended to be exemplary and explanatory but not restrictive of the invention. The accompanying drawings which are incorporated in and constitute a part of this invention, illustrate one embodiment of the invention, and together with the description, serve to explain the principles of the invention in general terms. Throughout the disclosure, like numerals refer to like parts.

BRIEF DESCRIPTION OF THE DRAWINGS

FIG. 1 is a perspective view of an automatic coffee brewing system embodying the invention;

FIG. 2 is a detail side elevation view of the coffee brewing system illustrated in FIG. 1;

FIG. 8 is a top plan view of the coffee brewing system, certain parts being cut away for purposes of clarity;

FIG. 11 is a detail bottom plan view of components illustrated in FIGS. 9 and 10;

FIG. 15 is a front elevation view of an escutcheon utilized on the front face of the coffee brewing system of the invention.

DESCRIPTION OF THE PREFERRED EMBODIMENT

Figure 3:
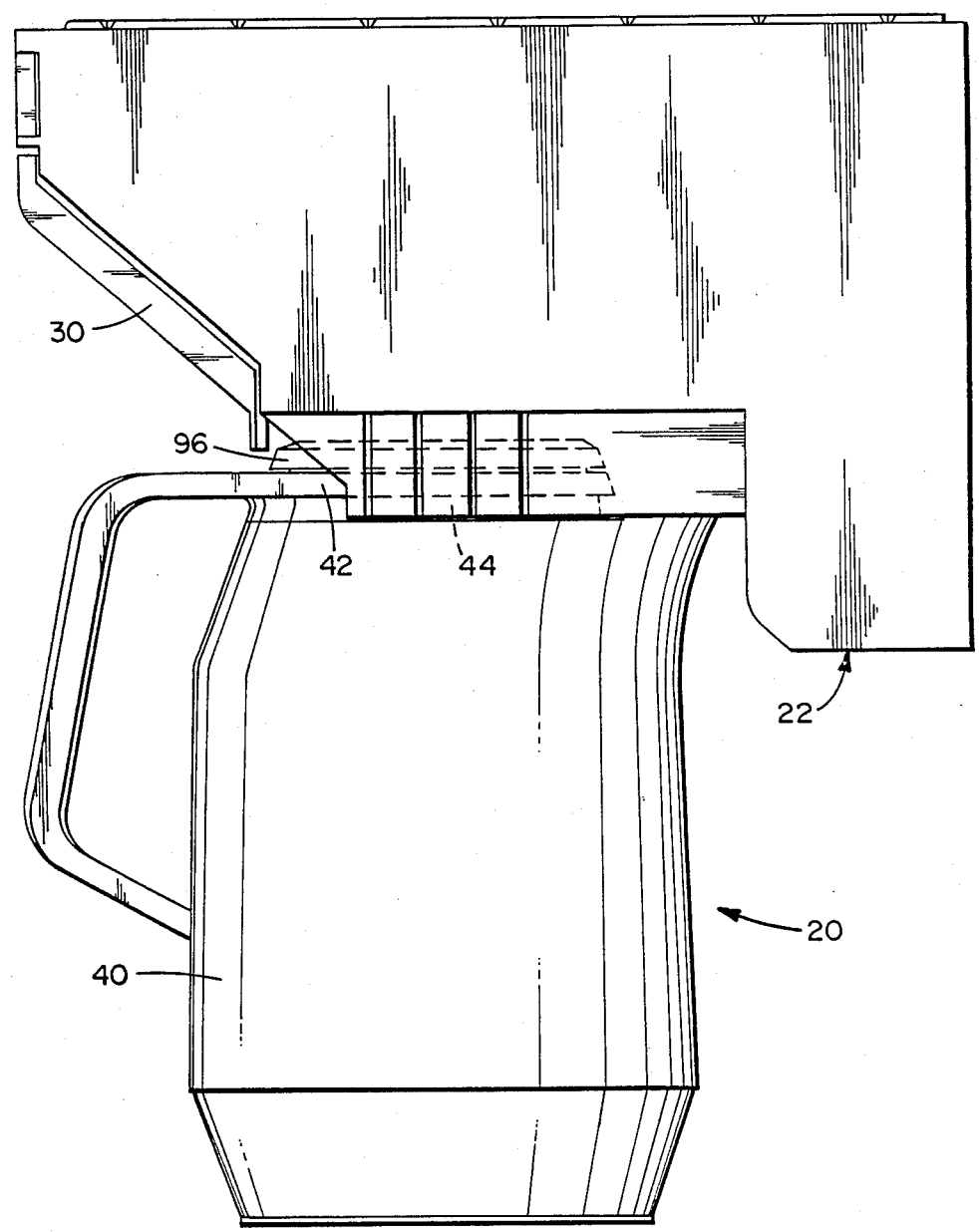
FIG. 3 is an enlarged side elevation view of the system illustrated in FIG. 2.
Figure 4:
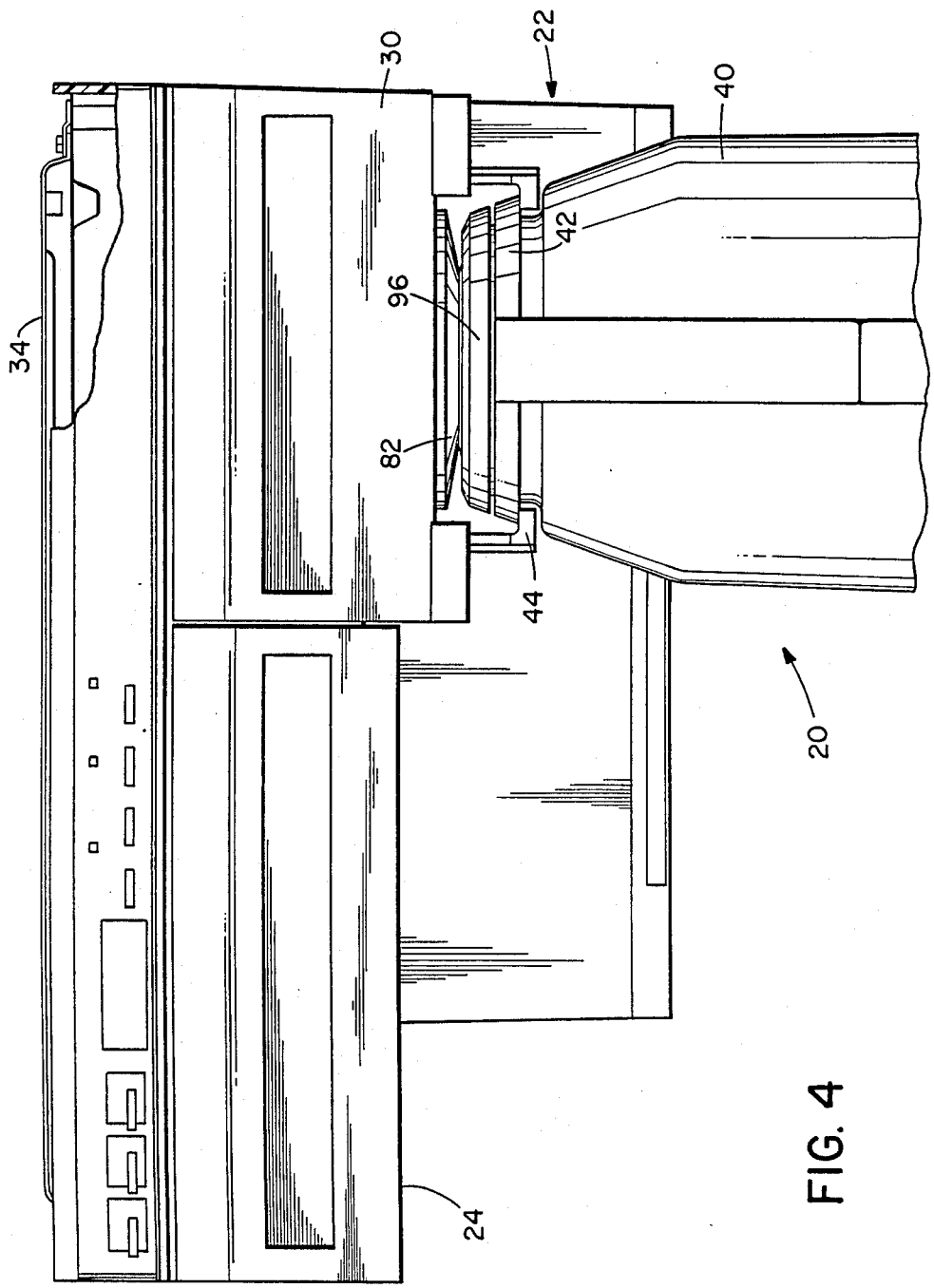
FIG. 4 is a front elevation view of the coffee brewing system illustrated in FIG. 1, certain parts being cut away and shown in section for purposes of clarity.
Figure 5:
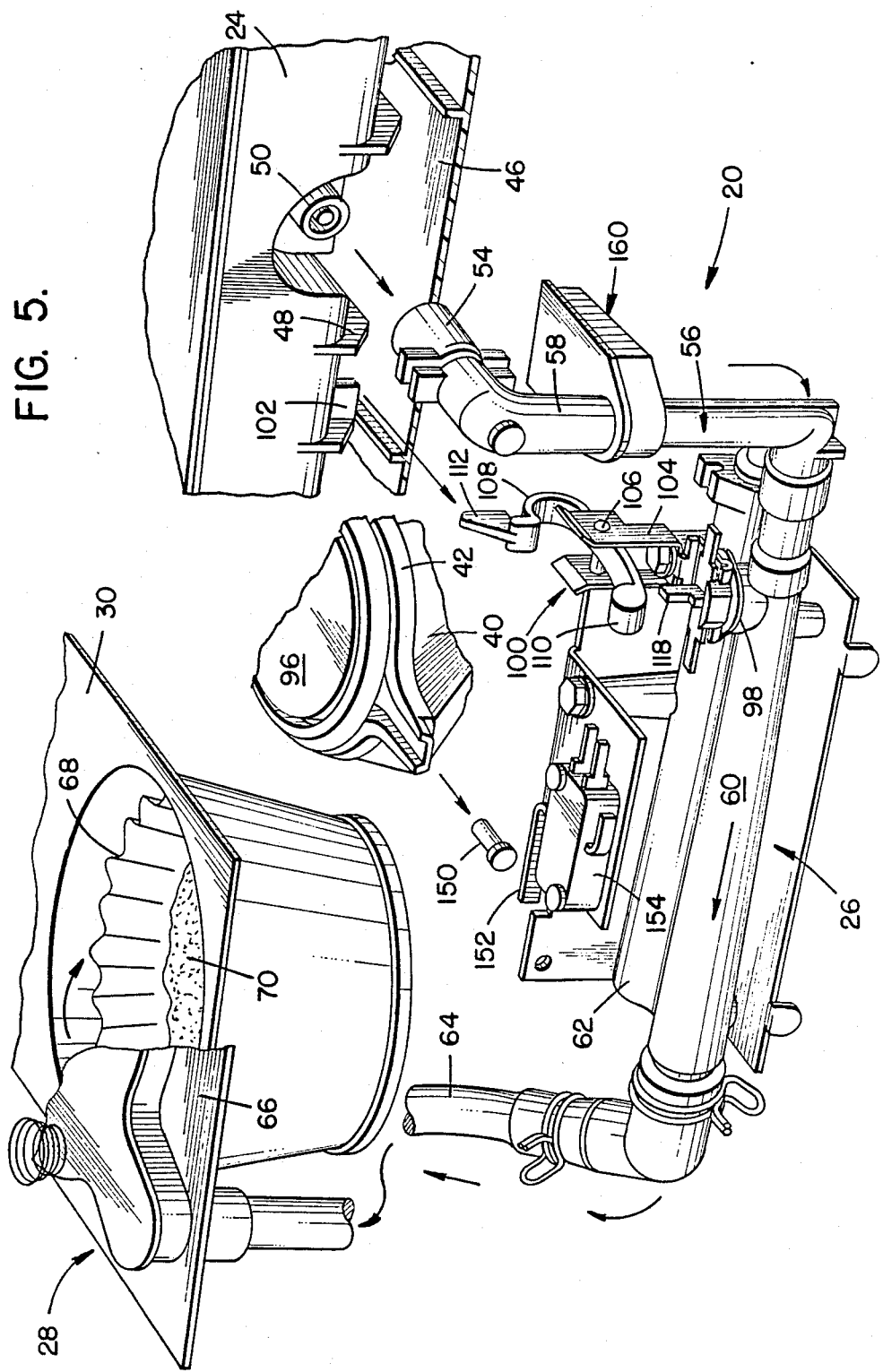
FIG. 5 is an exploded perspective view, taken from the rear of the coffee brewing system of the invention.
Figure 6:
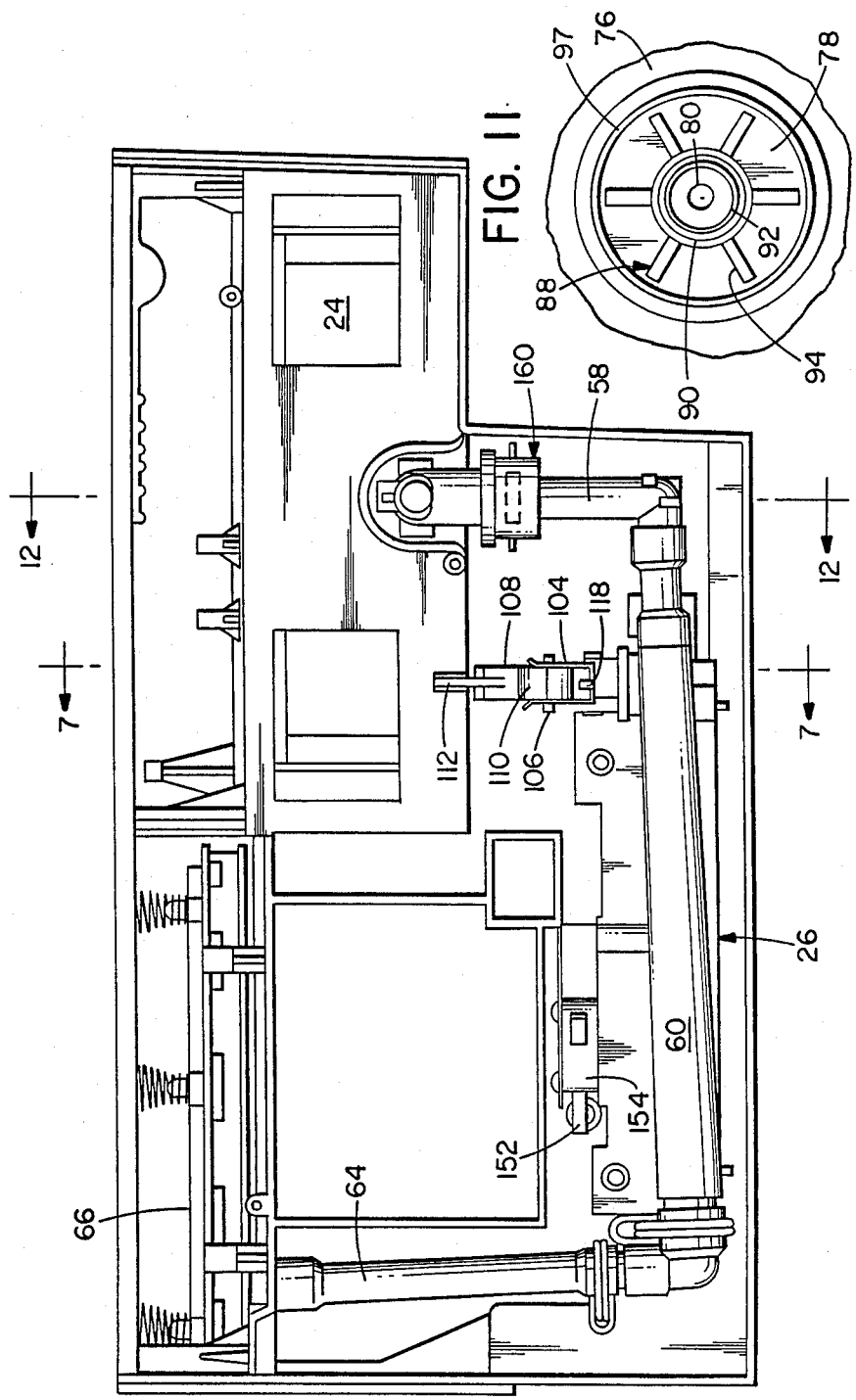
FIG. 6 is a rear elevation view of the coffee brewing system of the invention.

Turn now to the drawings and, initially, to FIGS. 1-4 which illustrate an automatic coffee brewing system 20 which embodies the present invention. The system 20 includes a main housing unit 22 which contains all of the necessary elements for brewing coffee, specifically, a self contained water reservoir 24, a water heating and pumping system 26 (see FIGS. 5 and 6), and a brewing station 28 including a coffee basket 30.

The housing unit may be attached to the underside of a cabinet 32 or of any horizontal surface by means of an intermediate bracket 34 (FIG. 4) and secured with screws or other suitable mounting devices. In its mounted condition, especially as seen in FIG. 2, the housing unit 22 is of minimal height and provides a maximum of room above a countertop 36 and, especially, between the countertop and the cabinet 32. The lowest part of the housing unit 22 is located at its rearmost side adjacent a wall 38 and, therefore, substantially out of the way.

A vessel for receiving brewed coffee is preferably in the form of an insulated carafe 40 which is an independent part of the coffee brewing system 20. The carafe is provided with a rim 42 at its upper regions which is supportively and slidably received by a pair of opposed support tracks 44. By reason of this construction, the carafe does not require bottom support while in its operative position. It can, therefore, be much taller than traditional coffee receiving vessels intended to be positioned under a cabinet thereby improving the ease with which coffee can be poured from it. The relationship between the rim 42 and the support 44 also enables the carafe to be readily moved from a withdrawn position to an operative position as illustrated in FIGS. 1-4.

Figure 7:
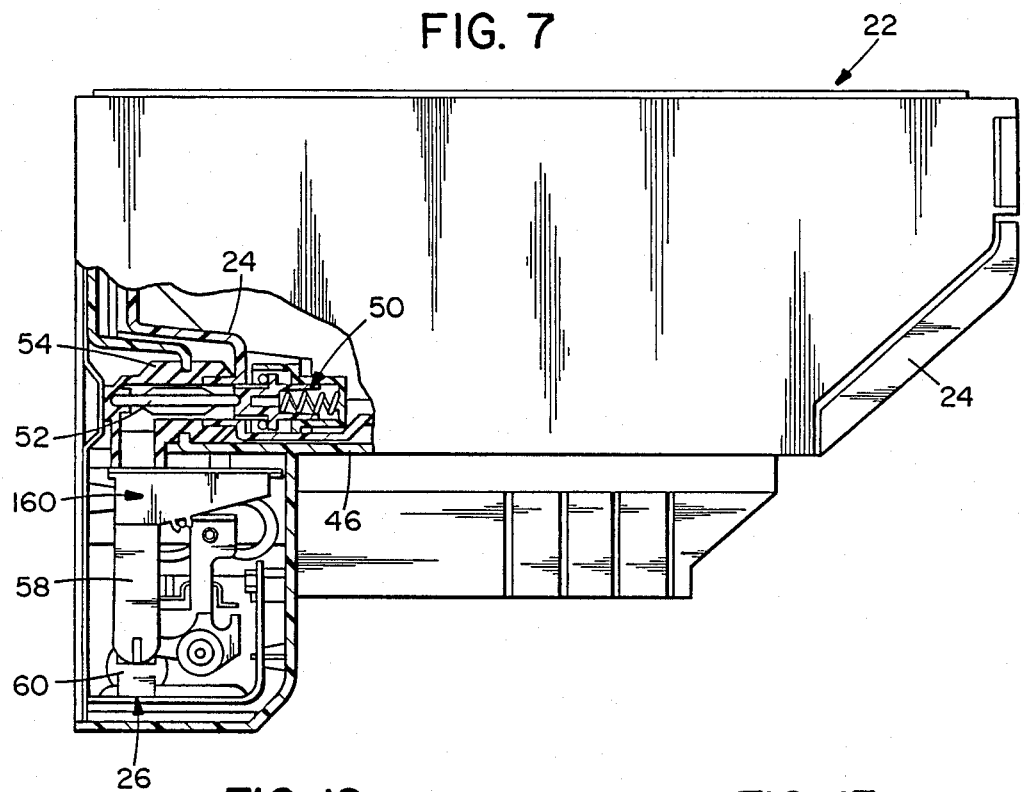
FIG. 7 is an end elevation view of the coffee brewing system of the invention, certain parts being cut away along line 7—7 in FIG. 6 and shown in section for purposes of clarity.

The water reservoir 24 is self contained and is generally in the form of an enclosed drawer which is slidably received on a shelf 46 of the housing unit 22. A plurality of spaced parallel runners 49 integral with the reservoir 24 and extending downwardly therefrom serve to improve the slidability of the reservoir on the shelf 46. Thus, the reservoir 24 can be withdrawn from the housing unit 22, filled from a faucet with an amount of water equivalent to the number of cups of coffee desired, then reinserted into the unit. Viewing especially FIGS. 5 and 7, when the reservoir 24 is in its operative position, an outlet valve 50 which is normally biased closed is engaged by a needle 52 mounted within a fitting 54 located at an extreme end of the water heating and pumping system 26. The water heating and pumping system 26 includes a water supply conduit 56 which is in communication with and extends between the fitting 54 and the brewing station 28. It includes a descending leg 58, a transverse leg 60, and an ascending leg 62.

The system 26 also includes an electrically energizable hot water generator 62 immediately adjacent the transverse leg 60 which operates in a known manner for heating of water in the supply conduit to a sufficient extent as it flows from the reservoir 24 to the brewing station 28 to enable coffee to be brewed at the brewing station. In the general operation of the system 20, in a known manner, water flows from the reservoir 24 through the descending leg 58, then across the transverse leg 60 where it is heated by the hot water generator 62. Thereafter, the resulting water and steam mixture rises through the ascending leg 64 to a shower plate 66 which overlies the coffee basket 30. Also in a known manner, a filter 68 of paper or other suitable material is positioned in the coffee basket 30 to receive fresh ground coffee 70. Hot water pumped by the generator 62 through the ascending leg 64 passes through a plurality of suitably positioned openings 72, 74 (see FIG. 8) in the shower plate 66 onto and through the ground coffee 70 and filter 68 for eventual reception by the carafe 40 when in its operating position.

Figure 9:
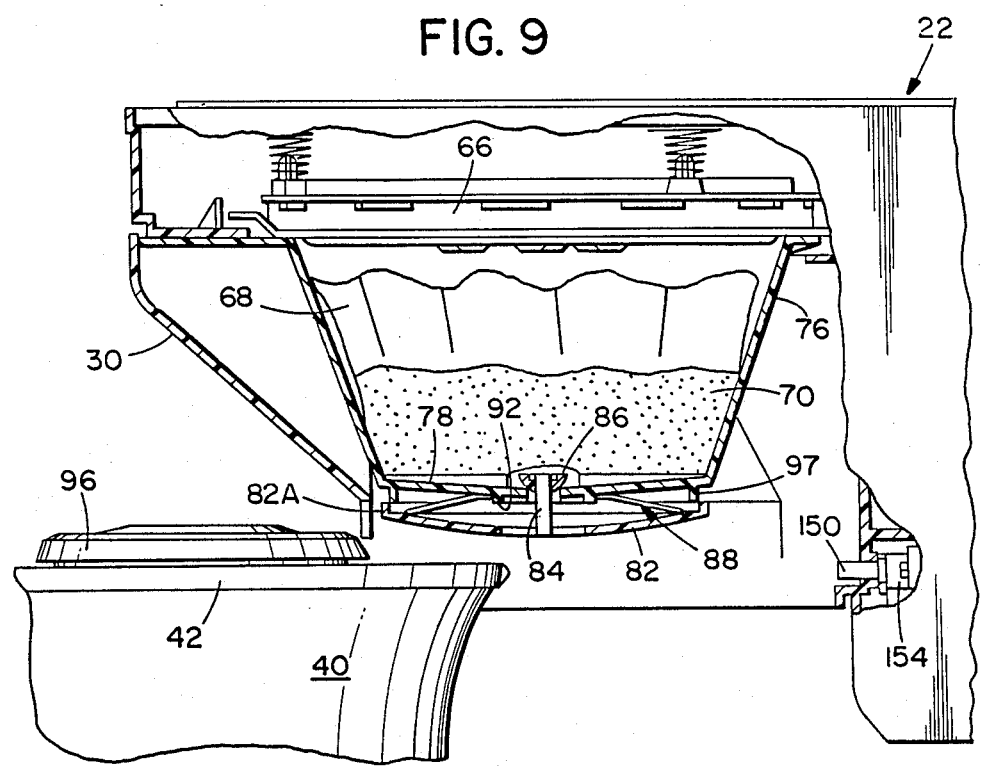
FIGS. 9 and 10 are side elevation views, certain parts being cut away and illustrated in section, illustrating two positions of a coffee receiving carafe to show its interrelationship with a coffee basket utilized by the invention.
Figure 10:
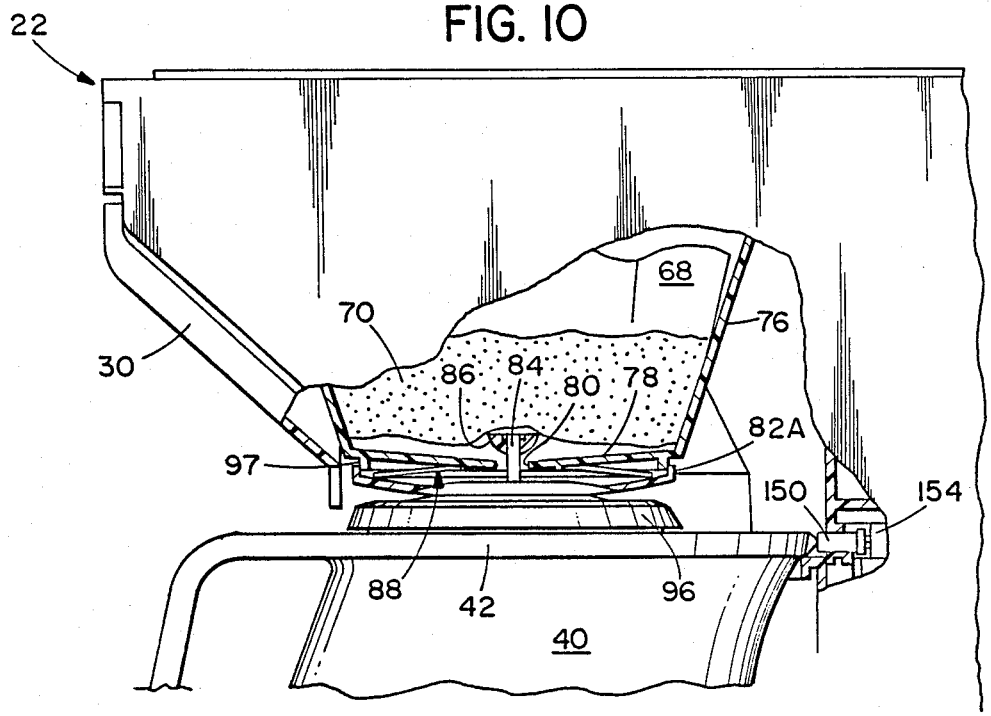

With particular reference now to FIGS. 9 and 10, the coffee basket 30 is seen to include a side wall 76 and a bottom wall 78 for supporting the filter 68 and ground coffee 70 therein. The bottom wall 78 is provided with at least one centrally disposed discharge opening 80 and generally slopes downwardly from the sidewall to the discharge opening. A generally disc shaped, contoured, cam plate 82 underlies the bottom wall 78 and is substantially coextensive therewith. The cam plate 82 has a concave surface which faces the bottom wall and a convex surface which faces away from the bottom wall. A pin member 84 is fixed to the cam plate 82 and extends in a transverse direction away from a central region of the concave surface of the cam plate, then freely through the discharge opening 80 in the bottom wall 78. A deformable valve member 86 composed of rubber or other suitable material is fixed to the pin member distant from the cam plate 82.

A spider spring member 88 is interposed between the bottom wall 78 and the cam plate 82 and serves to bias the cam plate 82 away from the bottom wall 78. As seen in FIGS. 9-11, the spider spring member 88 includes a central ring 90 which is coaxially received over a circular rib 92 which protrudes outwardly from the bottom wall 78. A plurality of resilient legs 94 extend radially outwardly from the central ring 90 and also extend away from the bottom wall 78 when it assumes the relationship illustrated in FIGS. 9 and 10. The central ring 90 bears against the bottom wall 78 while the extremities of the legs 94 bear against the concave surface of the cam plate 82.

Thus, when the cam plate 82 is in its relaxed position as illustrated in FIG. 9, the valve member 86 engages a valve seat defined as the intersection within the coffee basket of the bottom wall 78 and the discharge opening 80. As a result, coffee is normally prevented from issuing from the coffee basket. However, when the carafe 40 is moved from its withdrawn position as seen in FIG. 9 to its operative position as illustrated in FIG. 10, an upper lid 96 of the carafe engages the cam plate 82, unseating the valve member 86 and allowing coffee to flow, by gravity, into the carafe. Subsequently, when the carafe 40 is withdrawn, as to the position illustrated in FIG. 9, the cam plate 82 returns to its relaxed position, the valve member again seals the discharge opening 80 and any liquid coffee remaining in the coffee basket 30 is prevented from dripping, undesirably, upon the countertop 36 or whatever else is located beneath the housing unit 22.

A second circular rib 97, concentric with the first rib 92, similarly extends away from the bottom wall 78. The cam plate 82 terminates at an upturned circular rim 82A which is concentric with and proximate to the second rib 97. The circular rim and the second rib are mutually cooperable to guide the cam plate 82 between the first and second positions, the second rib being engageable with the cam plate and the circular rim being engageable with the extended surface of the bottom wall when the cam plate is in the valve unseating position.

Figure 12:
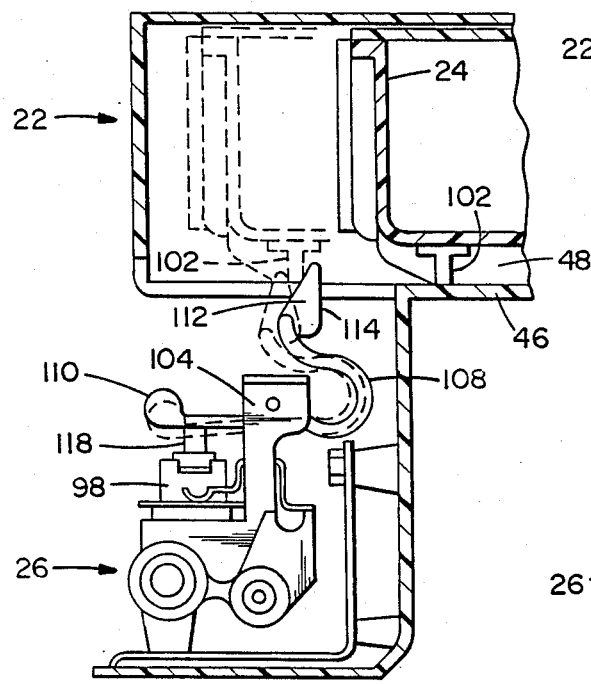
FIGS. 12 and 13 are cross section views taken generally along line 12—12 in FIG. 6 and illustrating different respective positions of components illustrated in those figures.

In order to operate the hot water generator 62, it is necessary to actuate an associated manual reset thermostat switch 98. An improved actuating mechanism for this purpose will now be described with particular reference to FIGS. 5, 12, and 13. The thermostat, or temperature sensitive switch, 98 is commonly available from numerous sources, but one example of a switch suitable for purposes of the invention is Model No. INT03 manufactured by Texas Instruments, Inc. of Austin, Tex. being of a manual reset type, the switch 98 need only be pressed once, without the need of continuing to press the switch to maintain its actuation. An actuating mechanism 100 has been devised to accomplish this end result in combination with another operation which must also be performed.

The manner of moving the reservoir 24 from a withdrawn position to an operative position for connection to the water supply conduit 56 has previously been described. As the reservoir 24 is moved from its withdrawn position and toward its operative position, a downwardly extending tab 102 integral with the reservoir engages the actuating mechanism 100 in a manner to be described. A pair of parallel, spaced, support ears 104 are suitably mounted on a housing encompassing the transverse leg 60 and the hot water generator 62. A stub shaft 106 extends between and is supported by the ears 104, and, in turn, supports an arcuate shaped, resilient, rocker cam 108 which extends between an actuator member 110 at one end and a cam member 112 fixed to its opposite end.

Figure 13:
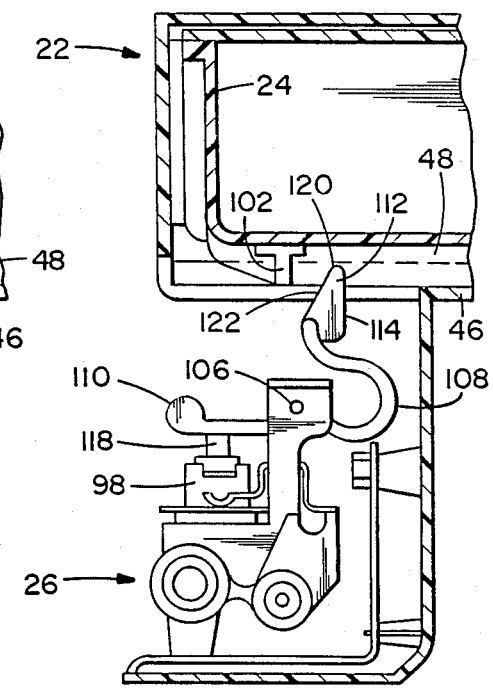

As the reservoir 24 moves toward the left (FIG. 12) as it approaches its operative position, the tab 102 engages a first surface 114 of the cam member 112. With continued movement of the reservoir in the same direction, cam member 112 travels with it and causes the rocker cam 108 to rotate on the stubshaft 106 in a counterclockwise direction until the member 110 engages a button 118 of the switch 98 and thereby resets the switch. With continued leftward movement of the reservoir, the rocker cam 108 is caused to deform until the tab 102 overrides an extreme tip 120 of the cam 112. When the reservoir reaches its operative position as seen in FIG. 13, the rocker cam 108 returns to its normal, relaxed position disengaged from the button 118. Subsequently, when it is desired to withdraw the reservoir from the housing unit 22, it is moved to the right (FIG. 12) until it engages a surface 122 on an opposite side of the cam member 112. Continued rightward (FIGS. 12 and 13) movement of the reservoir 24 causes the rocker cam 108 to pivot in a clockwise direction around the stubshaft 106 until the tab 102 again overrides the extreme tip 120 and allows the rocker cam 108 to return to its normal position (FIG. 13).

With the aid of FIG. 14, a control system for operating the automatic coffee brewing system 20 will now be described. The control system 124 operates to initiate a brewing cycle and, once the brewing cycle has been initiated, enabling it to proceed to its conclusion. However, in accordance with the invention, the control system also operates to prevent the brewing cycle from proceeding in the event any one of a plurality of operating conditions are not implemented.

Figure 14:
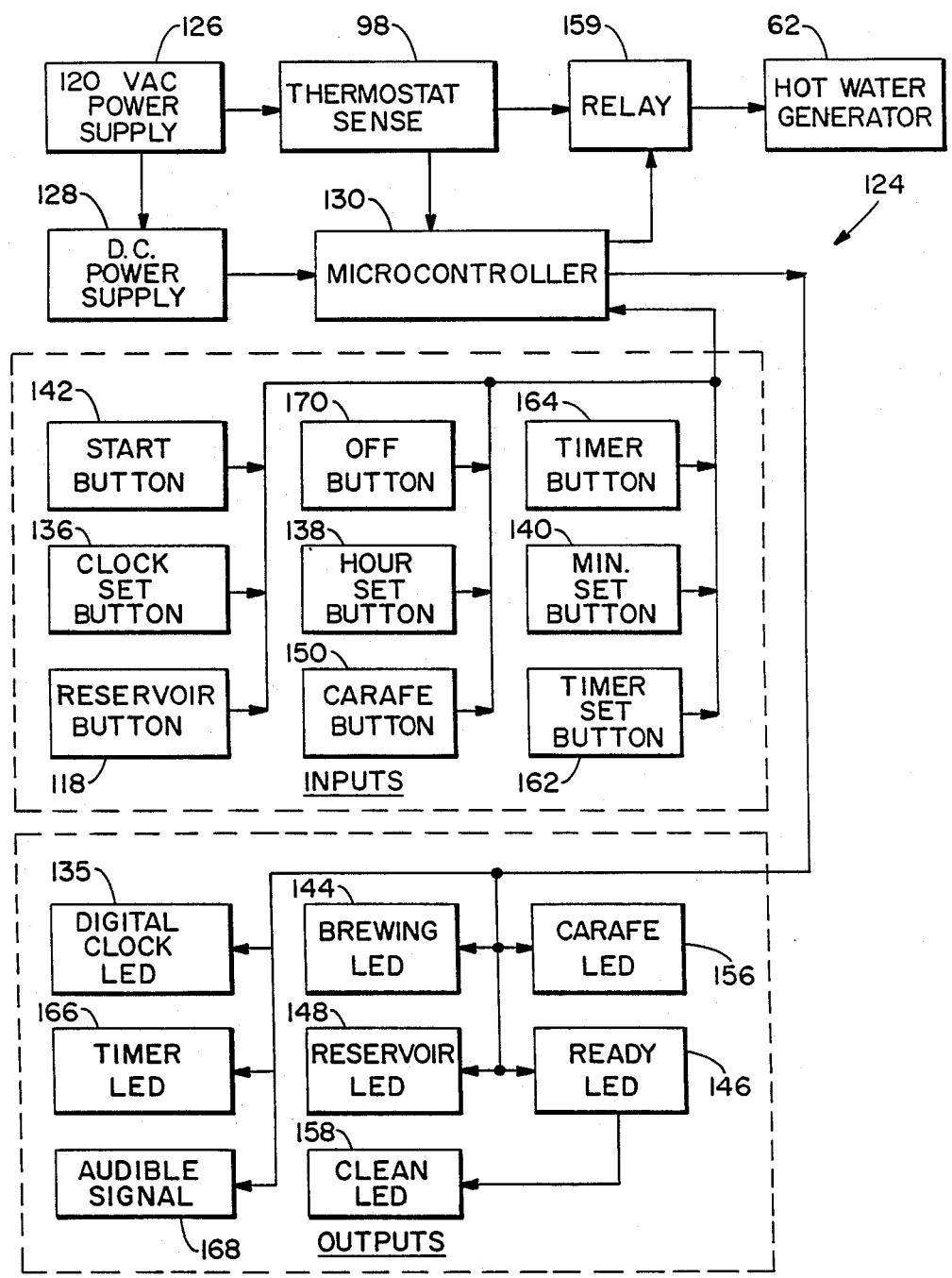
FIG. 14 is a block diagram of a control system used to operate the coffee brewing system of the invention.

As illustrated in FIG. 14, the brewing system 20 is AC powered as represented by a customary 120 VAC power supply 126. In a customary manner, the power supply 126 energizes a DC power supply 128 which in turn powers the electronic portion of the control system. A central component of the control system is a microcontroller 130 of known design, one example suitable for purposes of the invention being Model No. TMS 1000 manufactured by Texas Instruments, Inc. of Austin, Tex. The microcontroller serves to assure that a proper sequence of steps in the brew cycle is performed and if interrupted for failure of an operating condition to be implemented, will continue with the normal sequence of the brew cycle from the point left off when such an operating condition or conditions are once again implemented.

As seen in FIG. 1, and more particularly, in FIG. 15, a face plate or escutcheon 132 is provided on the housing unit 22 and indicates a number of inputs to the brewing system which can be performed by the user as well as a number of outputs for indicating the operating condition of the system. Table 1, which follows, provides a functional description of the operative, or input, components of the brewing system 20 and Table 2, which also follows, similarly provides a description of the informational, or output, components of the system.

TABLE 1
FUNCTIONAL DESCRIPTION OF OPERATIVE COMPONENTS
Inputs: Characteristic and/or Operation

| | | |
|---|---|---|
| 1. | START button | Manual mode, momentary switch |
| 2. | OFF button | Everything off, momentary switch, turns everything off except time-of-day (TOD) display (clock) |
| 3. | TIMER button | Auto brew mode, momentary switch |
| 4. | CLOCK SET button | Momentary switch, prepare TOD to be changed |
| 5. | TIMER SET button | Momentary switch, displays time of brew (TOB) as currently set; also prepares TOB to be changed |
| 6. | HOUR SET button | Momentary switch, advance HOURS @ 2 Hz rate |
| | MINUTE SET button | Momentary switch, advance MINUTES @ 2 Hz rate |
| | | Push both, advance both @ 2 Hz rate Display MINUTES & HOURS as they change |
| 7. | RESERVOIR | Micro switch, senses reservoir in operative position; interrupts brew cycle when open |
| 8. | CARAFE button | Micro switch, senses carafe in operative position; interrupts brew cycle when open |
| 9. | THERMOSTAT-SENSE | Detects when brew cycle is complete (thermostat switch opens); time count down to lighting of "Ready" lamp then begins; also opens after approximately 40 seconds to interrupt brew cycle: |
| | | (1) when no water in reservoir or |
| | | (2) when insufficient water flow because of calcified condition. |

TABLE 2
DESCRIPTION OF INFORMATIONAL COMPONENTS
Outputs: Information Presented

| | |
|---|---|
| 1. DIGITAL CLOCK: | 3½ digits, 7 segment LED characters AM/PM indicators Show TOD during normal operation Show TOB, once TIMER button is pressed |
| 2. BREWING | LED (lamp) Indicates unit is "on" - if all conditions are met Indicates brewing cycle is in progress as a result of pressing either START button or TIMER button. Time delay of approx. 40 seconds allows time for all coffee to drip into carafe from brewing basket after brew cycle ends before it turns off. |
| 3. READY | LED (lamp) Turns on approx. 40 seconds after brew cycle is complete. Turns off first time carafe is removed after brew cycle. |
| 4. TIMER | LED (lamp) Indicates unit is preset for "automatic on" at some later time. Turns off once unit begins brew cycle - if all conditions are met. |
| 5. RESERVOIR | LED (lamp) When lighted, indicates that (1) RESERVOIR is not in operative position, or (2) thermostat is open, or (3) a dry run has occurred. |
| 6. CARAFE | LED (lamp) when lighted, indicates that CARAFE is not in operative position. |
| 7. CLEAN | LED (lamp) Turns on if water is present upstream of heater mechanism after READY lamp is lighted. |
| 8. AUDIBLE SIGNAL | Piezoelectric beeper Double beep at 1 Hz rate for all fault conditions; also operates in conjunction with |

TABLE 2-continued
DESCRIPTION OF INFORMATIONAL COMPONENTS
Outputs: Information Presented
READY LED to indicate brew cycle completion.

Each of the components mentioned in Tables 1 and 2 will now be considered in the following description of the operation of the coffee brewing system 20.

After the brewing system has been connected to the power supply 126 in a customary fashion, as by means of a plug (not shown), the brewing system 20 is in a standby or waiting mode. In this mode, a digital clock 134, which, preferably, utilizes seven segment LED characters 135 (FIG. 14), flashes "12:00 AM". At this point, the time of day (TOD) may be set by pressing a clock set button 136 and, while holding it pressed, pressing in sequence an hour set button 138 and a minute set button 140. Thereafter the clock 134 will display the correct time but all other functions of the brewing system remain in the dormant state until a start button 142 or a timer button 164 (to be described) has been pressed.

A brew cycle may be initiated by the brewing system 20 either manually or automatically. In the manual mode, the user actuates the start button 142 and if all operating conditions have been implemented, the microcontroller 130 will see to it that the brew cycle is performed to its conclusion resulting in an amount of brewed coffee within the carafe 40 consistent with the amount of fresh ground coffee 70 placed by the user in the coffee basket 30 and a corresponding amount of water introduced to the water reservoir 24. In the event all of the operating conditions have been implemented and a brewing cycle is actually underway, a brewing lamp 144 (FIGS. 14 & 15) is lighted to indicate this fact. At the conclusion of the brew cycle, that is, when all of the water has left the water supply conduit 56, a ready lamp 146 becomes lighted and the brewing lamp 144 turns off. In actual fact, it is preferable for the operation of the ready lamp 146 and deactivation of the brewing lamp 144 to be delayed by a short period of time, for example, 40 seconds or in any event less than one minute in order to accommodate any remaining drippage of coffee from the coffee basket 30 into the carafe 40.

The operating conditions which must be implemented in order for a movably actuated brew cycle to proceed to its conclusion will now be discussed. First, the water reservoir 24 must be in its operative position with the valve 50 matingly engaged with the fitting 54 to assure its connection to the water supply conduit 56. In this operative position, the tab 102 will already have actuated the reset button 118 of the thermostat switch 98 to thereby move the thermostat switch to its closed position. However, not only must the reservoir 24 be in its operative position, but it must also contain a sufficient amount of water for a meaningful brew cycle to commence. Therefore, if in fact, the reservoir is in its operative position but the user forgets to fill it partially or completely with water, the brew cycle will begin, but the thermostat switch 98 will be caused to open after a short passage of time as, for example, 40 seconds, or, in any event in less than one minute. That is, since no water will be flowing through the transverse leg 60, it will become heated to a temperature at which the thermostat switch 98 opens to inactivate the system. In either the event that the reservoir 24 is not in its operative position or that the thermostat switch 98 has been caused to open for lack of water in the reservoir, a reservoir lamp 148 (FIG. 14 and 15) is caused to be lighted to indicate this failed condition.

Next, the carafe 40 must be in the operative position (FIGS. 1-3) engaged with a button 150 (see especially FIGS. 5 and 10) slidably received on the housing unit 22 for selective engagement with an arm 152 of a microswitch 154. So long as the carafe is in its operative position, a carafe lamp 156 (FIGS. 14 and 15) remains unlighted, but when the carafe is withdrawn from its operative position, the lamp is lighted to indicate that the condition is no longer implemented and the brew cycle is interrupted.

Another helpful indication provided by the coffee brewing system 20 is that it is time to clean the water supply conduit of substantial accumulated mineral deposits. Such a condition is indicated by a "clean" lamp 158 which is lighted in response to operation of a sensing mechanism 160. The clean lamp 158 becomes lighted only after the ready lamp 146 becomes lighted at the end of the brew, that is, after the thermostat switch 98 opens.

The clean lamp 158, then, serves to notify the user that the water supply conduit 56 needs cleaning in the known manner, but still permits a brew cycle to continue to its conclusion. In the extreme instance in which the water supply conduit 56 will no longer permit the flow of water because of a totally calcified condition, however, the ready lamp 146 would not be activated, nor would the clean lamp 158 be activated, since the former drives the latter. In this instance, the microcontroller 130 would be informed by the thermostat switch 98 (FIG. 14) that it is in the open position and would operate a relay 159 to open and thereby deenergize the hot water generator 62. The thermostat switch 98 would be caused to open because of the excessive heat generated in the absence of the cooling effect of water flowing through the supply conduit 56. The sensing mechanism 160 may be of the novel construction disclosed in commonly assigned U.S. Application Ser. No. 216,706, filed 7-6-88, of Paul D. Johnson, et al entitled "Calcification Indicator" and filed concurrently with the instant application. The aforesaid application is hereby fully incorporated into this application, by reference.

The sensing mechanism 160 operates on the principal that the presence of water in the supply conduit 56 upstream of the hot water generator 62 after the thermostat switch 98 opens is indicative of the presence of substantial mineral deposits located primarily in the transverse leg 60 which thereby prevents all the water initially in the reservoir 24 from being received at the brewing station 28 prior to completion of the brew cycle.

For operating the brewing system 20 in the automatic mode, the user must set the timer for the clock 134 to the desired time for initiating a brew cycle. The time of brew (TOB) may be set by pressing a timer set button 162 and, while holding it pressed, pressing in sequence the hour set button 138 and the minute set button 140. Time so chosen is displayed by the clock 134 so long as the timer set button 162 is held depressed. However, in order to activate the automatic mode, a timer button 164 must be depressed which causes a timer lamp 166 to be lighted to indicate that the brewing system 20 has now been set for automatic operation. Depressing the timer button 164 also causes the clock 134 to display the preset time for the brew cycle to commence as previously set. Upon releasing the timer button 164, the clock 134 returns to its display of the time of day.

If all of the operating conditions discussed above in the description of the manual mode of operation are implemented at the preset time for the automated brew cycle to commence, the brew cycle will indeed commence and continue to its conclusion so long as all of the conditions continue to be so implemented. However, in the event a condition is not implemented at the preset time, a brewing cycle will not commence even if all conditions are implemented at some later time.

On each occasion that an implemented condition subsequently changes to no longer being implemented, not only does the particular display lamp become lighted, but an audible signal as, for example, a piezoelectric beeper is operated to cause a double beep at a one Hz rate to so inform the user. This audible signal is indicated in FIG. 14 by a reference numeral 168.

When it becomes necessary or desirable to turn off the brewing system 20, an off button 170 may be momentarily depressed. This serves to return the brewing system 20 to a standby or waiting mode in which only the clock 134 continues to display the time of day.

To further assist in a complete description of the invention, Tables 3, 4, and 5 are provided and may be referred to for a more specific explanation of the various operations performed by the brewing system.

TABLE 3

TRUTH TABLE - AUTOMATIC COFFEE BREWING SYSTEM

| CONTROL PUSH | CARAFE SWITCH | RE-SERVOIR SWITCH | MAIN T'STAT | POWER RELAY | LED INDICATORS "BREWING" | "TIMER" | "CARAFE" | "READY" | "RESERVOIR" | "CLEAN" | AUDIO- .5 SEC ON/ .5 SEC OFF/ |
|---|---|---|---|---|---|---|---|---|---|---|---|
| ON | | | | | | | | | | | |
| -SET UP- | | | | | ALL OF THESE CONDITIONS ARE CONTINUOUSLY CHECKED UNTIL "BREWING CYCLE" BEGINS | | | | | | |
| | O | O | C | OFF | OFF | OFF | ON | OFF | ON | N/A | 2 BEEPS |
| | O | O | C | OFF | OFF | OFF | ON | OFF | ON | | 2 BEEPS |
| | O | O | C | OFF | OFF | OFF | ON | OFF | OFF | | 2 BEEPS |
| | C | O | C | OFF | OFF | OFF | OFF | OFF | ON | | 2 BEEPS |
| | C | O | C | OFF | OFF | OFF | OFF | OFF | ON | | 2 BEEPS |
| | O/C | C | O | OFF | OFF | OFF | ON/OFF | OFF | ON | | 2 BEEPS |
| -BREW CYCLE | C | C | C | ON | ON | OFF | OFF | OFF | OFF | N/A | OFF |
| | | | | | "BREWING CYCLE" AUTOMATICALLY BEGINS WHEN CONDITIONS BELOW ARE MET | | | | | | |
| | | | | | IF CARAFE OR RESERVOIR SWITCHES ARE OPENED DURING "BREWING CYCLE", POWER AND BREW TIME ARE INTERRUPTED | | | | | | |
| -DRY RUN | C | C | O | ON | OFF | OFF | OFF | OFF | ON (BREW TIME 1 MINUTE) | N/A | 2 BEEPS |
| | | | | | IF BREW CYCLE IS STARTED WITHOUT WATER, "ON-DRY RUN" CONDITIONS ARE SET AS SHOWN | | | | | | |
| -BREW INTERRUPT | O | C | C | OFF | OFF | OFF | ON | OFF | OFF | N/A | |
| | | | | | BREW CYCLE AUTOMATICALLY RESUMES (AT INTERRUPT CONDITIONS) WHEN BOTH CARAFE AND RESERVOIR SWITCHES ARE CLOSED | | | | | | |
| -READY | C | C | O | ON | OFF | OFF | OFF | ON (DELAY 40 SEC.) | OFF | * (DELAY 40 SEC.) | 2 BEEPS |
| -STAND-BY | O | O | C | OFF | OFF | OFF | OFF | OFF | OFF | N/A | |
| | | | | | CONTROL GOES TO "OFF" MODE AND STAYS THERE AFTER CARAFE SWITCH IS OPENED FOR FIRST TIME | | | | | | |
| OFF | O/C | O/C | O/C | OFF | OFF | OFF | OFF | OFF | OFF | N/A | OFF |
| AUTO | O | O | O | OFF | OFF | OFF | ON | OFF | ON | N/A | 2 BEEPS |
| -SET UP | O | O | C | OFF | OFF | OFF | ON | OFF | ON | | 2 BEEPS |
| | O | O | C | OFF | OFF | OFF | ON | OFF | OFF | | 2 BEEPS |
| | C | O | C | OFF | OFF | OFF | OFF | OFF | ON | | 2 BEEPS |
| | C | O | C | OFF | OFF | OFF | OFF | OFF | ON | | 2 BEEPS |
| | O/C | C | O | OFF | OFF | OFF | ON/OFF | OFF | ON | | 2 BEEPS |
| | | | | | ALL OF THESE CONDITIONS ARE CONTINUOUSLY CHECKED UNTIL "TIMER-SET" BEGINS | | | | | | |
| -SET | C | C | C | OFF | OFF | ON | OFF | OFF | OFF | N/A | OFF |

*Clean light is lit only when ready light is lit and coffee maker requires cleaning.

NOTE:
O = open
C = closed

TABLE 4
GENERAL NOTES CONCERNING OPERATION OF AUTOMATIC COFFEE BREWING SYSTEM

BREW SET TIME FLASHES ON CLOCK FOR 2 TIMES UPON REACH "TIMER-SET", NO BEEPS.
WHEN BREW SET TIME = TIME OF DAY, PROGRAM RECYCLES AUTOMATICALLY TO "ON - SET UP".
IF SET-UP FAILS, UNIT IS RELEASED FROM AUTO MODE, BUT ERROR DISPLAY REMAINS ON INDICATING WHAT THE FAULT IS. ERROR TO BE NOTED IMMEDIATELY IF IT OCCURS DURING AUTO CYCLE.
PUSHING "ON" WHILE IN "TIMER SET" MODE WILL AUTOMATICALLY RETURN TO "ON - SET-UP". TIMER LED GOES OFF, AUTO FUNCTION IS RELEASED.
PUSHING "OFF" AT ANY TIME WILL SWITCH TO "OFF" MODE.
INITIAL POWER UP ALWAYS RETURNS CONTROL TO "OFF".

TABLE 5
CLOCK SET MODE - AUTOMATIC COFFEE BREWING SYSTEM

| MODE | CLOCK SET | TIMER SET | HOURS | MINUTES | DISPLAY |
|---|---|---|---|---|---|
| NORMAL | O | O | O | O | TIME OF DAY |
|  | O | O | O | C | TIME OF DAY |
|  | O | O | C | O | TIME OF DAY |
|  | O | O | C | C | TIME OF DAY |
| CLOCK SET | C | O | C | O | SETS TIME OF DAY "HOURS" |
|  | C | O | C | C | SETS TIME OF DAY "HOURS" AND "MINUTES" |
|  | C | O | O | C | SETS TIME OF DAY "MINUTES" |
|  | C | O | O | O | LAST TIME SET (HOLDS) |
| BREW SET | O | C | O | O | TIME TO BREW (HOLDS) |
|  | O | C | C | O | SETS TIME TO BREW "HOURS" |
|  | O | C | O | C | SETS TIME TO BREW "MINUTES" |

NOTE:
(1) ON INITIAL POWER UP - DISPLAY WILL FLASH "12:00 AM" UNTIL "TIME" IS SET.
(2) DISPLAY TO SHOW 12:00 TO 11:59 WITH AM AND PM INDICATED.
(3) CLOCK SET RATE TO BE 2 HZ.
(4) BREW SET TIME IS HELD AND REPEATED EVERY 24 HOURS IF TIMER BUTTON IS PRESSED DAILY BEFORE THE BREW SET TIME. (STARTS AT 12:00 A.M ON INITIAL POWER UP).
(5) COLON TO BE ALWAYS NON-FLASHING.
(6) WHEN "TIMER" LED INDICATOR FIRST COMES ON, BREW SET TIME IS "FLASHED" ON CLOCK TWICE FOR 2 SECONDS.
(7) IF HOUR SET AND MINUTE SET BUTTONS ARE PRESSED SIMULTANEOUSLY, ONLY "HOURS" WILL BE SET; THIS IS TRUE FOR BOTH CLOCK SET AND BREW SET.

While a preferred embodiment of the invention has been disclosed in detail, it should be understood by those skilled in the art that various modifications may be made to the illustrated embodiment without departing from the scope as described in the specification and defined in the appended claims.

What is claimed is:

1. Automatic coffee brewing apparatus comprising:
   a self-contained water reservoir movable between a withdrawn position and an operative position;
   a brewing station;
   a water supply conduit in communication with and extending between said brewing station and said water reservoir when said reservoir is in said operative position to enable the flow of water from said reservoir to said brewing station;
   an electrically energizable hot water generator intermediate said brewing station and said operative water reservoir for heating water in said supply conduit to a sufficient extent as it flows from said reservoir to said brewing station to enable coffee to be brewed at said brewing station; and
   control means for initiating a brewing cycle and, thereafter, for enabling the brewing cycle to proceed to its conclusion and including interrupt means for preventing the brewing cycle from proceeding in the event any one of a plurality of operating conditions are not implemented.

2. Automatic coffee brewing apparatus as set forth in claim 1:
   wherein said control means includes a microcontroller operable for preventing continuation of a brewing cycle already in progress in the event any one of the plurality of operating conditions are not implemented, then subsequently, for reinstating the brewing cycle and enabling the brewing cycle to proceed to its conclusion when all of the plurality of operating conditions are once again implemented.

3. Automatic coffee brewing apparatus as set forth in claim 1:
   wherein said control means includes:
   timer means for initiating a brewing cycle at a preset activation time, said interrupt means being operable for preventing initiation of the brewing cycle at the preset activation time.

4. Automatic coffee brewing apparatus as set forth in claim 3:
   wherein said control means includes a microcontroller operable for preventing continuation of a brewing cycle already in progress in the event, after the preset activation time established by said timer means, any one of the plurality of operating conditions are not implemented, then subsequently, for reinstating the brewing cycle and enabling the brewing cycle to proceed to its conclusion when all of the plurality of operating conditions are once again implemented.

5. Automatic coffee brewing apparatus as set forth in claim 3:
   wherein said timer means includes:
   a clock registering the time of day and means for setting the registered time to the correct local time;
   memory means for storing the preset activation time and means for setting the activation time to a selected time; and signal means for generating an activation signal upon the coincidence of the time of day registered by said clock and the preset activation time when all of the plurality of operating conditions are implemented and for generating an inactivation signal after the preset activation time when fewer than all of the plurality of operating conditions are implemented.

6. Automatic coffee brewing apparatus as set forth in claim 5 including:
a source of electrical power; and
wherein said control means includes:
conductor means alterable between a conductive state electrically coupling said hot water generator to said source of electrical power and a non-conductive state; and
power selection means responsive to said activation signal for altering said conductor means to said conductive state and responsive to said inactivation signal for altering said conductor means to said non-conductive state.

7. Automatic coffee brewing apparatus as set forth in claim 6:
wherein said conductor means includes a relay moveable between a closed position for electrically coupling said hot water generator to said source of electrical power and an open position for de-coupling said hot water generator from said source of electrical power.

8. Automatic coffee brewing apparatus as set forth in claim 5 including:
digital display means for selectively displaying the time of day and the preset activation time.

9. Automatic coffee brewing apparatus as set forth in claim 5 including:
timer display means responsive to said memory means when a preset activation time has been stored therein for indicating such.

10. Automatic coffee brewing apparatus as set forth in claim 9:
wherein said timer display means includes a lamp.

11. Automatic coffee brewing apparatus as set forth in claim 1 including:
a vessel for receiving brewed coffee from said brewing station movable between a withdrawn position and a coffee receiving position; and
wherein said control means includes a carafe switch movable between an open disabling position when said vessel is in the withdrawn position and moved by said vessel to a closed enabling position when said vessel is in said coffee receiving position.

12. Automatic coffee brewing apparatus as set forth in claim 11:
wherein said vessel is an insulated carafe.

13. Automatic coffee brewing apparatus as set forth in claim 11 including:
carafe display means for indicating that said vessel is not in said coffee receiving position.

14. Automatic coffee brewing apparatus as set forth in claim 13:
wherein said carafe display means includes a lamp.

15. Automatic coffee brewing apparatus as set forth in claim 1:
wherein said control means includes a reservoir switch movable between an open disabling position when said reservoir is in the withdrawn position and moved by said reservoir to a closed enabling position when said reservoir is in said operative position.

16. Automatic coffee brewing apparatus as set forth in claim 15 including:
reservoir display means responsive to the position of said reservoir switch for indicating that said reservoir is not in said operative position.

17. Automatic coffee brewing apparatus as set forth in claim 16:
wherein said reservoir display means includes a lamp.

18. Automatic coffee brewing apparatus as set forth in claim 1:
wherein said control means includes temperature sensitive switch means having open and closed positions and movable to a latched open position for electrically de-energizing said hot water generator when the temperature thereof exceeds a predetermined magnitude.

19. Automatic coffee brewing apparatus as set forth in claim 18:
wherein said control means includes:
sensing means operable after said temperature sensitive switch means moves to the open position for detecting the presence of water in said supply conduit upstream of said heater mechanism, such presence of water being an indication of the presence of substantial mineral deposits in said supply conduit and thereby preventing all of the water initially in said reservoir from being received at said brewing station; and including:
clean display means responsive to the detection of water in said supply conduit by said sensing means for indicating the need to clean said supply conduit of the mineral deposits which have accumulated therein.

20. Automatic coffee brewing apparatus as set forth in claim 19 including:
ready display means for indicating that the brewing cycle is complete, said ready display means being responsive to movement of said temperature sensitive switch to said open position and to said sensing means when it detects the absence of water in said supply conduit upstream of said heater mechanism after said temperature sensitive switch moves to said open position.

21. Automatic coffee brewing apparatus as set forth in claim 18 including:
brewing display means responsive, respectively, to operation of said control means for initiating a brewing cycle, to failure of operation of said interrupt means, and to said temperature sensitive switch being in said open position for indicating that the brewing cycle is in progress.

22. Automatic coffee brewing apparatus as set forth in claim 18 including:
sensing means operable after said temperature sensitive switch means moves to the open position for detecting the presence of water in said supply conduit upstream of said heater mechanism, such presence of water being an indication of the presence of substantial mineral deposits in said supply conduit and thereby preventing all of the water initially in said reservoir from being received at said brewing station;
a housing;
wherein said reservoir is a self contained unit of finite capacity selectively movable on said housing between a withdrawn position and an operative position for connection to said water supply conduit and includes an actuating tab thereon; and cam actuating means on said housing engageable by said actuating tab when said reservoir is moved toward said operative position for initially moving said temperature sensitive switch means to said closed position.

23. Automatic coffee brewing apparatus as set forth in claim 22 wherein said temperature sensitive switch means includes a manual reset switch having an actuating button; and wherein said cam actuating means includes:

a rocker cam pivotally mounted intermediate a first end positioned for engagement by said actuating tab and a second end positioned for engagement of said actuating button of said temperature sensitive switch means.

24. Automatic coffee brewing apparatus as set fort in claim 23 wherein said rocker cam includes:

an actuator member; and a cam member fixed to said first end of said actuator member positioned in the path of said reservoir as said reservoir is moved between said withdrawn and said operative positions.

25. A coffee brewing apparatus as set forth in claim 24:

wherein said member is of an elongated arcuate shape and is composed of resilient material enabling its movement between a relaxed position and first and second extreme positions in the plane of movement of said reservoir;

whereby, as said reservoir is moved toward said operative position from said withdrawn position, said actuating tab engages said cam member and moves it from said relaxed position to said first extreme position whereat said second end engages said actuating button, then with continued movement releases said cam member for return to said relaxed position; and whereby, as said reservoir is moved from said operative position toward said withdrawn position, said actuating tab engages said cam member and moves it from said relaxed position to said second extreme position whereat said second end is distant from said actuating button, then with continued movement releases said cam member for return to said relaxed position.

26. Automatic coffee brewing apparatus as set forth in claim 1:

wherein said brewing station includes:

a coffee basket including a sidewall and a bottom wall for supporting ground coffee therein, said bottom wall having at least one discharge opening therein, said coffee basket being positioned intermediate said hot water generator and a vessel for receiving brewed coffee whereby heated water is caused to flow through the ground coffee to the vessel via the discharge opening; and cam operated valve means biased to a first position for preventing flow of coffee through the discharge opening and movable to a second position permitting flow of coffee through the discharge opening.

27. Automatic coffee brewing apparatus as set forth in claim 26:

wherein said bottom wall has a centrally disposed discharge opening, said bottom wall sloping downwardly from said sidewall to the discharge opening when said coffee basket is operatively positioned thereby enabling flow by gravity from said coffee basket through the discharge opening and into the vessel.

28. Automatic coffee brewing apparatus as set forth in claim 27:

wherein said valve means includes:

a valve seat at the intersection within said coffee basket of said bottom wall and the discharge opening;

a generally disk shaped cam plate having a concave surface facing said bottom wall and a convex surface facing away from said bottom wall;

a pin member fixed to said cam plate and extending transverse thereto away from a central region of said concave surface, said pin member extending freely through the discharge opening in said bottom wall;

a deformable valve member fixed to said pin member distant from said cam plate and movable between a closed position sealingly engaged with said valve seat and an open position disengaged from said valve seat; and resilient means positioned between said bottom wall and said cam plate biasing said cam plate to said first position distant from said bottom wall whereat said valve member is sealingly engaged with said valve seat, said cam plate being movable to said second position upon the application of force directed transversely against said convex surface whereat said valve member is in the open position.

29. Automatic brewing apparatus as set forth in claim 28:

wherein said cam plate is substantially circular and coextensive with said bottom wall; and wherein said pin member is fixed to a center of said cam plate and is perpendicular thereto.

30. Automatic brewing apparatus as set forth in claim 29:

wherein said bottom wall has an external surface facing said cam plate with a first raised circular rib thereon concentric with the discharge opening; and wherein said resilient means includes:

a ring concentric with said first rib having an inner diameter substantially equal to the outer diameter of said first rib and lying in a plane parallel to and contiguous with said bottom wall; and a plurality of resilient fingers integral with said ring and extending radially outwardly therefrom and ever more out of the plane of said ring toward said cam plate with increasing distance away from said ring, each of said fingers terminating at a tip engaged with said concave surface of said cam plate.

31. Automatic brewing apparatus as set forth in claim 30:

wherein said external surface of said bottom wall has a second raised circular rib concentric with said first rib and spaced therefrom in a direction away from the discharge opening; and wherein said cam plate extends to an upturned circular rim concentric with and proximate to said second rib, said circular rim and said second rib being mutually cooperable to guide said cam plate between said first and second positions, said second rib being engageable with said cam plate and said circular rim being engageable with said external surface of said bottom wall when said cam plate is in the second position.

32. Automatic coffee brewing apparatus as set forth in claim 26 including:
   a vessel for containing brewed coffee movable between a withdrawn position and a coffee receiving position for receiving brewed coffee from said coffee basket.

33. Automatic coffee brewing apparatus as set forth in claim 32:
   wherein said vessel includes a lid engageable with said valve means when said vessel is in said coffee receiving position for moving said valve means to said second position thereby enabling flow of coffee through the discharge opening into said vessel.

34. Automatic coffee brewing apparatus as set forth in claim 32:
   wherein said vessel in an insulated carafe.

35. Automatic coffee brewing apparatus comprising:
   a self-contained water reservoir movable between a withdrawn position and an operative position;
   a brewing station;
   a water supply conduit in communication with and extending between said brewing station and said water reservoir when said reservoir is in said operative position to enable the flow of water from said reservoir to said brewing station;
   an electrically energizable hot water generator intermediate said brewing station and said operative water reservoir for heating water in said supply conduit to a sufficient extends as it flows from said reservoir to said brewing station to enable coffee to be brewed at said brewing station; and
   temperature sensitive switch means having open and closed positions and movable to a latched open position for electrically de-energizing said hot water generator when the temperature thereof exceeds a predetermined magnitude;
   said water reservoir being operable to move said temperature sensitive switch to said closed position upon movement to said operative position or when the temperature of said hot water generator is less than said predetermined magnitude.

36. Automatic coffee brewing apparatus as set forth in claim 35:
   wherein said temperature sensitive switch means includes a manual reset switch having an actuating button; and
   wherein said cam actuating means includes:
   a rocker cam pivotally mounted intermediate a first end positioned for engagement by said actuating tab and a second end positioned for engagement of said actuating button of said temperature sensitive switch means.

37. A coffee brewing apparatus as set forth in claim 36:
   wherein said rocker cam includes:
   an actuator member; and
   a cam member fixed to said first end of said actuator member positioned in the path of said reservoir as said reservoir is moved between said withdrawn and said operative positions.

38. A coffee brewing apparatus as set forth in claim 37:
   wherein said member is of an elongated arcuate shape and is composed of resilient material enabling its movement between a relaxed position and first and second extreme positions in the plane of movement of said reservoir;
   whereby, as said reservoir is moved toward said operative position from said withdrawn position, said actuating tab engages said cam member and moves it from said relaxed position to said first extreme position whereat said second end engages said actuating button, then with continued movement releases said cam member for return to said relaxed position; and
   whereby, as said reservoir is moved from said operative position toward said withdrawn position, said actuating tab engages said cam member and moves it from said relaxed position to said second extreme position whereat said second end is distant from said actuating button, then with continued movement releases said cam member for return to said relaxed position.

* * * * *